United States Patent
Ohashi

(10) Patent No.: US 10,742,137 B2
(45) Date of Patent: Aug. 11, 2020

(54) POWER CONVERSION DEVICE, MOTOR DRIVE UNIT, AND ELECTRIC POWER STEERING DEVICE

(71) Applicant: Nidec Corporation, Kyoto (JP)

(72) Inventor: Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/292,479

(22) Filed: Mar. 5, 2019

(65) Prior Publication Data

US 2019/0199239 A1 Jun. 27, 2019

Related U.S. Application Data

(63) Continuation of application No. PCT/JP2017/031881, filed on Sep. 5, 2017.

(30) Foreign Application Priority Data

Sep. 26, 2016 (JP) ................................. 2016-186758

(51) Int. Cl.
| | |
|---|---|
| *H02M 7/5387* | (2007.01) |
| *H02P 27/06* | (2006.01) |
| *H02M 7/48* | (2007.01) |
| *H02M 7/46* | (2006.01) |
| *H02M 7/5395* | (2006.01) |

(52) U.S. Cl.
CPC .......... *H02M 7/5387* (2013.01); *H02M 7/46* (2013.01); *H02M 7/48* (2013.01); *H02M 7/5395* (2013.01); *H02P 27/06* (2013.01)

(58) Field of Classification Search
CPC .......... H02P 23/00; H02P 25/08; H02P 21/02; H02P 23/03; H02P 25/092; H02P 25/098; H02P 25/18; H02P 25/182; H02P 25/184; H02P 27/04; H02P 27/05; H02P 27/06
See application file for complete search history.

(56) References Cited

U.S. PATENT DOCUMENTS

| | | | | |
|---|---|---|---|---|
| 6,046,553 | A | * | 4/2000 | Matsunaga ........... B60L 3/0061 318/139 |
| 8,743,573 | B2 | | 6/2014 | Balpe |
| 2006/0108957 | A1 | | 5/2006 | Urakabe et al. |
| 2007/0290647 | A1 | | 12/2007 | Urakabe et al. |
| 2013/0094266 | A1 | | 4/2013 | Balpe |

FOREIGN PATENT DOCUMENTS

| | | | |
|---|---|---|---|
| JP | 2014-054094 A | | 3/2014 |
| JP | 2014-192950 A | | 10/2014 |

OTHER PUBLICATIONS

Official Communication issued in International Patent Application No. PCT/JP2017/031881, dated Nov. 7, 2017.

* cited by examiner

*Primary Examiner* — Gary L Laxton
(74) *Attorney, Agent, or Firm* — Keating & Bennett

(57) ABSTRACT

A power conversion device includes a first inverter connected to first ends of windings of each phase of a motor, a second inverter connected to second ends of the windings of each phase, and a first switching circuit including at least one of a first switch to switch between whether the first inverter and a power supply are connected or disconnected and a second switch to switch between whether the first inverter and a ground are connected or disconnected. The power conversion device has a first operation mode when the motor is driven at a low speed, and a second operation mode when the motor is driven at a high speed.

10 Claims, 10 Drawing Sheets

POWER CONVERSION DEVICE, MOTOR DRIVE UNIT, AND ELECTRIC POWER STEERING DEVICE

CROSS REFERENCE TO RELATED APPLICATIONS

This application claims the benefit of priority to Japanese Patent Application No. 2016-186758 filed on Sep. 26, 2016 and is a Continuation Application of PCT Application No. PCT/JP2017/031881 filed on Sep. 5, 2017. The entire contents of each application are hereby incorporated herein by reference.

BACKGROUND OF THE INVENTION

1. Field of the Invention

The present disclosure relates to a power conversion device, a motor driver, and an electric power steering device in which power supplied to an electric motor is converted.

2. Description of the Related Art

Generally, electric motors such as a brushless DC motor and an AC synchronous motor (hereinafter simply referred to as "motors") are driven by three-phase currents. A complex control technique such as vector control is used in order to accurately control waveforms of the three-phase currents. In such a control technique, an advanced mathematical operation is required, and a digital arithmetic circuit such as a microcontroller (microcomputer) is used. A vector control technique is utilized in fields in which load fluctuation of a motor is large, such as a washing machine, an electric assist bicycle, an electric scooter, an electric power steering device, an electric vehicle, and industrial equipment. On the other hand, in a motor whose output is relatively small, another motor control method such as a pulse width modulation (PWM) method is adopted.

In the automotive field, an automobile electronic control unit (ECU) is used in vehicles. The ECU has a microcontroller, a power supply, an input/output circuit, an AD converter, a load drive circuit, a read only memory, and the like. An electronic control system is built with the ECU as the core. For example, the ECU processes a signal from a sensor to control an actuator such as a motor. Specifically, the ECU controls an inverter in a power conversion device while monitoring the rotational speed and the torque of the motor. Under the control of the ECU, the power conversion device converts drive power supplied to the motor.

In recent years, an electromechanically integrated motor (referred to as "power pack" in the present specification) in which a motor, a power conversion device, and an ECU are integrated has been developed. Especially in the automotive field, high quality assurance is required from the viewpoint of safety. Therefore, a redundant design capable of keeping safe operation is adopted even in a case in which some parts have failed. As an example of a redundant design, installing two power conversion devices for one motor is considered. As another example, installing a backup microcontroller in a main microcontroller is considered.

SUMMARY OF THE INVENTION

Exemplary embodiments of the present disclosure provide a power conversion device capable of performing suitable current control over a wide range from low speed driving to high speed driving.

An exemplary power conversion device of the present disclosure converts power from a power supply to power to be supplied to a motor having n-phase windings, where n is an integer of 3 or greater, and includes a first inverter connected to first ends of windings of each phase of the motor a second inverter connected to the other end of the windings of each phase, and a first switching circuit including at least one of a first switch to switch between whether the first inverter and the power supply are connected or disconnected and a second switch to switch between whether the first inverter and a ground are connected or disconnected, wherein the power conversion device has a first operation mode in which power conversion is performed using the second inverter and a first neutral point in the windings of each phase of the first inverter when the motor is driven at a low speed, and a second operation mode in which power conversion is performed by n-phase energization control of the first and second inverters when the motor is driven at a high speed.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Before describing the exemplary embodiments of the present disclosure, the knowledge of the present inventor, which forms the basis of the present disclosure, will be described.

In a conventional power conversion device, a power supply and GND and each of two inverters are kept connected at all times. In view of this configuration, it is not possible to disconnect the power supply and the inverter. The inventor of the present application found a problem in that an inverter having a neutral point draws current from a power supply. As a result, power loss occurs.

As with the power supply, it is not possible to disconnect the inverter and the GND. The inventor of the present application found a problem in that a current supplied to windings of each phase through one inverter not having a neutral point flows to the GND from the other inverter without returning to the inverter of a supply source thereof. In other words, the inventor found a problem in that a closed loop of a drive current is not formed. It is desirable that a current supplied from one inverter to windings of each phase flows to the GND through the inverter of the supply source thereof.

Hereinafter, a power conversion device, motor drive unit, and electric power steering device of the present disclosure will be described with reference to the accompanying drawings. However, to avoid unnecessary redundancy of the following description and to facilitate understanding by those of ordinary skill in the art, more detailed description than necessary may be omitted in some cases. For example, detailed descriptions of already well-known matters or redundant description of substantially the same configuration may be omitted in some cases.

In the present specification, an embodiment of the present disclosure will be described with an example of a power conversion device that converts power to be supplied to a three-phase motor having three phase (U-phase, V-phase, and W-phase) windings. However, a power conversion device that converts power to be supplied to an n-phase motor having n-phase windings (where n is an integer of 4 or greater) such as four-phase or five-phase windings is also within the scope of the present disclosure.

Figure 1:
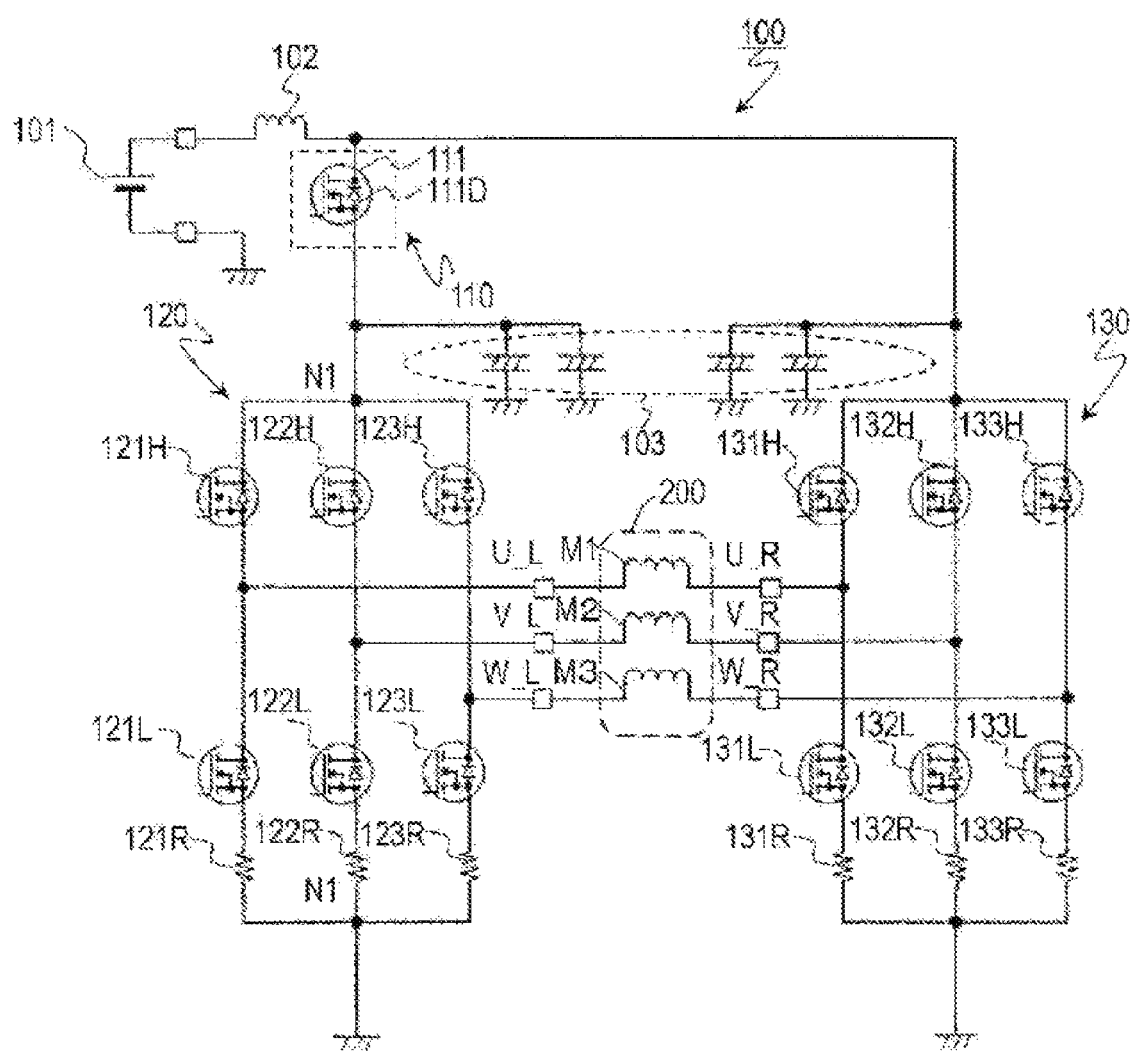
FIG. 1 is a circuit diagram illustrating a circuit configuration of a power conversion device 100 according to a first preferred embodiment of the present invention.

FIG. 1 schematically illustrates a circuit configuration of a power conversion device 100 according to the present preferred embodiment.

The power conversion device 100 has a switching circuit 110, a first inverter 120, and a second inverter 130. The power conversion device 100 may convert power to be supplied to various motors. A motor 200 is, for example, a three-phase AC motor. In the present specification, a left inverter in the drawings is referred to as a first inverter 120, and a right inverter in the drawings is referred to as a second inverter 130. Of course, the relationship may be reversed.

The motor 200 has a U-phase winding M1, a V-phase winding M2, and a W-phase winding M3, and is connected to the first inverter 120 and the second inverter 130. Specifically, the first inverter 120 is connected to one end of the windings of each phase of the motor 200, and the second inverter 130 is connected to the other end of the windings of each phase. In the present specification, "connection" between parts (elements) mostly refers to electrical connection. The first inverter 120 has terminals U_L, V_L, and W_L corresponding to each phase, and the second inverter 130 has terminals U_R, V_R, and W_R corresponding to each phase.

The terminal U_L of the first inverter 120 is connected to one end of the U-phase winding M1, the terminal V_L is connected to one end of the V-phase winding M2, and the terminal W_L is connected to one end of the W-phase winding M3. As with the first inverter 120, the terminal U_R of the second inverter 130 is connected to the other end of the U-phase winding M1, the terminal V_R is connected to the other end of the V-phase winding M2, and the terminal W_R is connected to the other end of the W-phase winding M3. Such connections with the motor are different from the so-called star connection and delta connection.

The switching circuit 110 has a first switch element 111. In the present specification, the switching circuit 110 disposed on a power supply 101 side may be referred to as "power-supply-side switching circuit" in some cases. The switching circuit 110 switches between whether the first inverter 120 and the power supply 101 are connected or disconnected.

The on and off of the first switching element 111 of the switching circuit 110 may be controlled by, for example, a microcontroller or a dedicated driver. As the first switch element 111, for example, a transistor such as a field effect transistor (typically a MOSFET) or an insulated gate bipolar transistor (IGBT) may be widely used, or a mechanical relay may be used. Hereinafter, an example in which an FET is used as the switch element of the switching circuit 110 will be described. For example, the first switch element 111 is referred to as an FET 111.

The FET 111 has a freewheeling diode 111D, and the freewheeling diode 111D is disposed so that the freewheeling diode 111D faces the power supply 101. More specifically, the FET 111 is disposed so that a forward current of the freewheeling diode 111D flows toward the power supply 101.

Embodiments are not limited to the illustrated example, and the number of switch elements used is appropriately determined in consideration of design specifications and the like. Especially in the automotive field, high quality assurance is required from the viewpoint of safety. Therefore, it is desirable that the switching circuit 110 has a plurality of switch elements.

Figure 2:
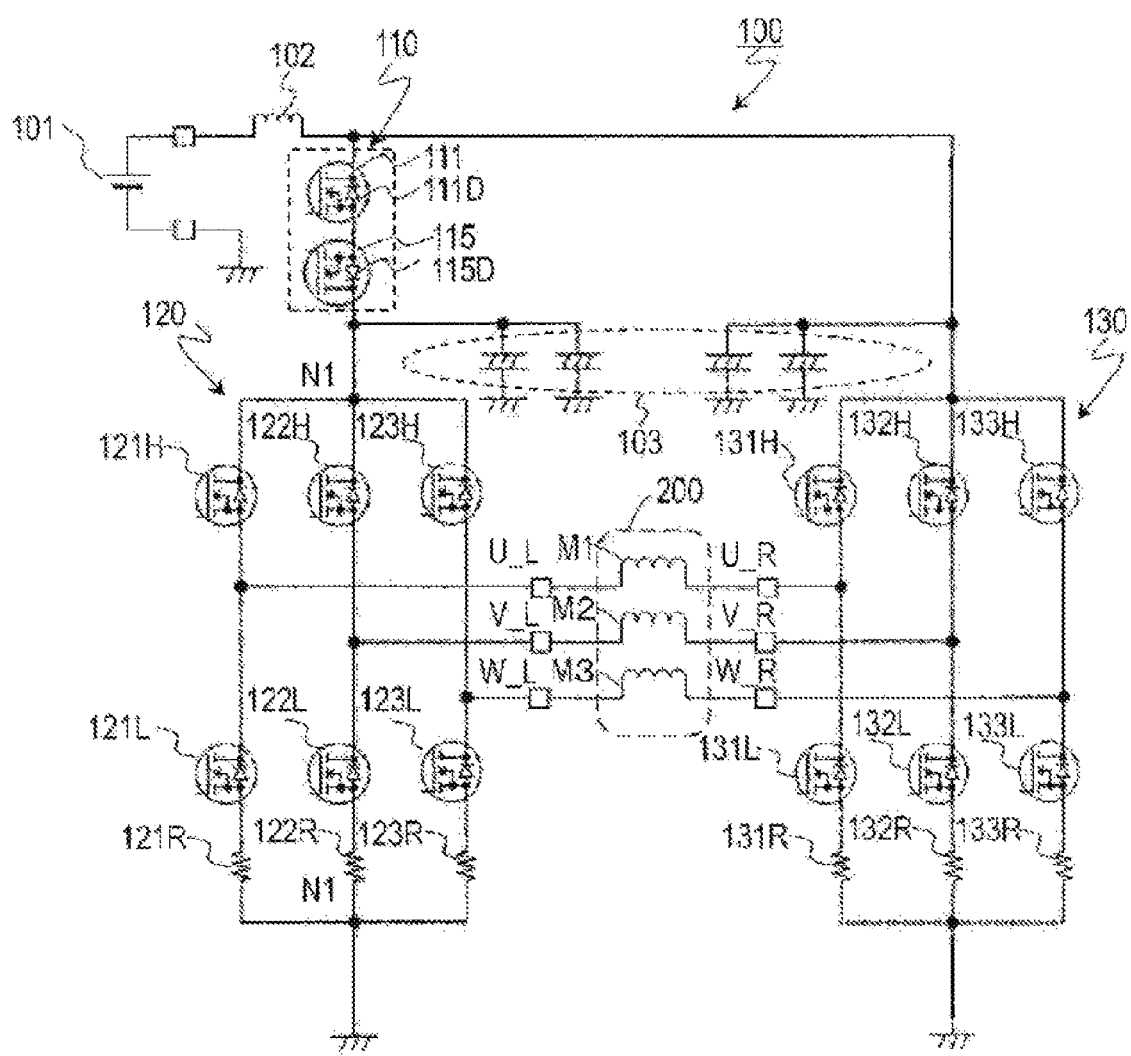
FIG. 2 is a circuit diagram illustrating another circuit configuration of the power conversion device 100 according to the first preferred embodiment of the present invention.

FIG. 2 schematically illustrates another circuit configuration of the power conversion device 100 according to the present preferred embodiment.

The switching circuit 110 may further include a switch element (FET) 115 for reverse connection protection. The FET 115 has a freewheeling diode 115D and is disposed so that the directions of the freewheeling diodes in the FETs are opposite to each other. Specifically, the FET 111 is disposed so that a forward current flows in the freewheeling diode 111D toward the power supply 101, and the FET 115 is disposed so that a forward current flows in the freewheeling diode 115D toward the first inverter 120. Even in a case in which the power supply 101 is connected in the reverse direction, a reverse current may be interrupted by the FET for reverse connection protection.

Refer back to FIG. 1.

The power supply 101 generates a predetermined power supply voltage. As the power supply 101, for example, a DC power supply is used. However, the power supply 101 may also be an AC-DC converter, a DC-DC converter, or a battery (rechargeable battery).

The power supply 101 may be a single power supply common to the first and second inverters 120 and 130, or may have a first power supply for the first inverter 120 and a second power supply for the second inverter 130.

A coil 102 is installed between the power supply 101 and each inverter. The coil 102 serves as a noise filter and smoothens high frequency noise included in a voltage waveform supplied to each inverter or high frequency noise generated by each inverter so that outflow of the high frequency noise to the power supply 101 side is prevented. A condenser 103 is connected to a power supply terminal of each inverter. The condenser 103 is a so-called bypass condenser and suppresses voltage ripple. The condenser 103 is, for example, an electrolytic condenser, and the capacity of the condenser 103 and the number of condensers 103 used are appropriately determined according to design specifications and the like.

The first inverter 120 (which is referred to as "bridge circuit L" in some cases) has a bridge circuit configured of three legs. Each leg has a low side switching element and a high side switching element. Switching elements 121L, 122L, and 123L illustrated in FIG. 1 are low side switching elements, and switching elements 121H, 122H, and 123H are high side switching elements. As the switching elements, for example, FETs or IGBTs may be used. Hereinafter, an example in which FETs are used as the switching elements will be described, and the switching elements are referred to as FETs in some cases. For example, the switching elements 121L, 122L, and 123L are referred to as FETs 121L, 122L, and 123L.

The first inverter 120 has three shunt resistors 121R, 122R, and 123R as current sensors (see FIG. 3) for detecting a current flowing through the windings of each phase of the U-phase, V-phase, and W-phase. A current sensor 150 has a current detection circuit (not illustrated) configured to detect a current flowing through each shunt resistor. For example, the shunt resistors 121R, 122R, and 123R are connected between the GND and the three low side switching elements included in the three legs of the first inverter 120. Specifically, the shunt resistor 121R is electrically connected between the FET 121L and the GND, the shunt resistor 122R is electrically connected between the FET 122L and the GND, and the shunt resistor 123R is electrically connected between the FET 123L and the GND. A resistance value of the shunt resistor is, for example, about 0.5 mΩ to 1.0 mΩ.

As with the first inverter 120, the second inverter 130 (which is referred to as "bridge circuit R" in some cases) has a bridge circuit configured of three legs. FETs 131L, 132L, and 133L illustrated in FIG. 1 are low side switching elements, and FETs 131H, 132H, and 133H are high side switching elements. The second inverter 130 has three shunt resistors 131R, 132R, and 133R. The shunt resistors are connected between the GND and the three low side switching elements included in the three legs. For example, each FET of the first and second inverters 120 and 130 may be controlled by a microcontroller or a dedicated driver. However, the connection example of the shunt resistors is not limited thereto. For example, the three shunt resistors 131R, 132R, and 133R may be disposed between the FET 111 and the FETs 121H, 122H, and 123H. Also, the number of shunt resistors for each inverter is not limited to three. For example, two shunt resistors 121R and 122R are used for the first inverter 120. The number of shunt resistors used and the arrangement of shunt resistors are appropriately determined in consideration of product cost and design specifications.

Figure 3:
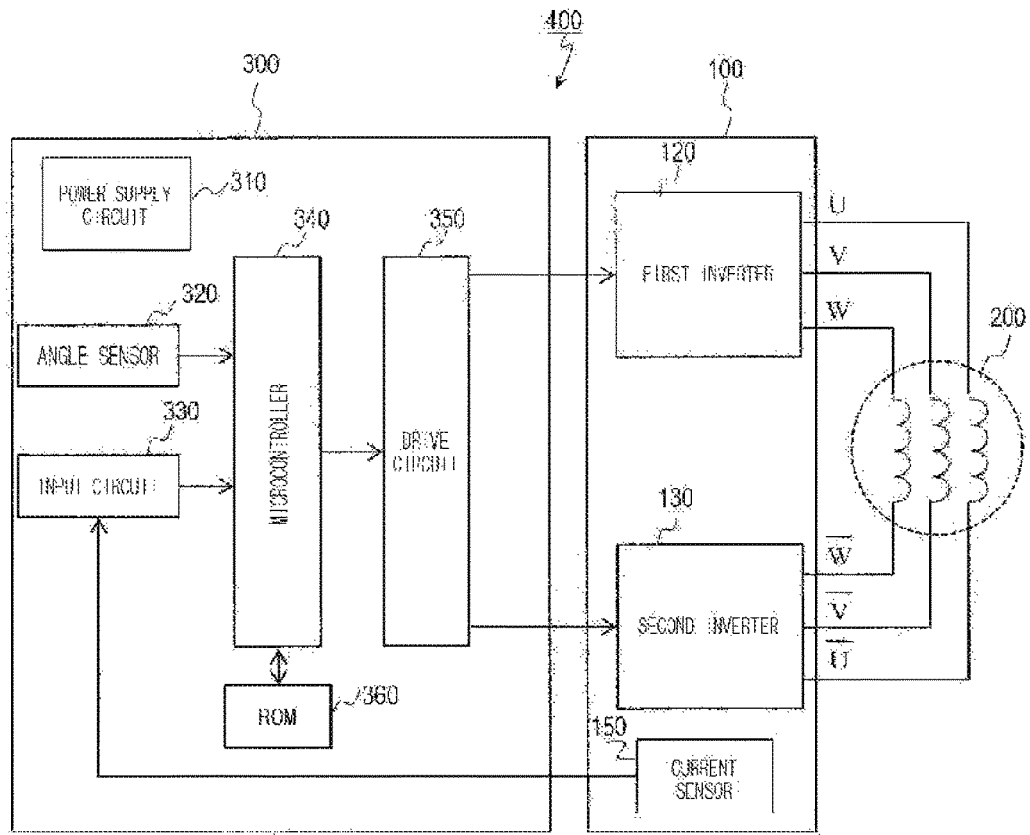
FIG. 3 is a block diagram illustrating a typical block configuration of a motor driver 400 including the power conversion device 100.

FIG. 3 schematically illustrates a typical block configuration of a motor drive unit 400 having the power conversion device 100.

The motor drive unit 400 has the power conversion device 100, the motor 200, and a control circuit 300.

The control circuit 300 has, for example, a power supply circuit 310, an angle sensor 320, an input circuit 330, a microcontroller 340, a drive circuit 350, and a ROM 360. The control circuit 300 is connected to the power conversion device 100 and controls the power conversion device 100, thereby driving the motor 200. For example, the control circuit 300 may realize closed loop control by controlling a target motor torque and rotational speed.

The power supply circuit 310 generates a DC voltage (for example, 3V or 5V) required for each block in the circuit. The angle sensor 320 is, for example, a resolver or a Hall IC. The angle sensor 320 detects an angle of rotation (hereinafter referred to as "rotation signal") of a rotor of the motor 200 and outputs the rotation signal to the microcontroller 340. The input circuit 330 receives a motor current value (hereinafter referred to as "actual current value") detected by the current sensor 150, converts a level of the actual current value to an input level of the microcontroller 340 as necessary, and outputs the actual current value to the microcontroller 340.

The microcontroller 340 controls a switching operation (turn-on or turn-off) of each FET in the first and second inverters 120 and 130 of the power conversion device 100. The microcontroller 340 sets a target current value according to the actual current value, the rotation signal of the rotor, and the like, generates a PWM signal, and outputs the generated PWM signal to the drive circuit 350. The microcontroller 340 may control on or off of the FET 111 in the switching circuit 110 of the power conversion device 100.

The drive circuit 350 is typically a gate driver. The drive circuit 350 generates a control signal (gate control signal) for controlling the switching operation of each FET in the first and second inverters 120 and 130 according to the PWM signal and supplies the control signal to the gate of each FET. Further, the drive circuit 350 may generate a gate control signal for controlling on or off of the FET 111 in the switching circuit 110 according to an instruction from the microcontroller 340 and may supply the control signal to the gate of the FET 111. However, the microcontroller 340 may have the function of the drive circuit 350. In that case, the control circuit 300 may not have the drive circuit 350.

The ROM 360 is, for example, a writable memory (for example, PROM), a rewritable memory (for example, flash memory), or a ROM. The ROM 360 stores a control program including an instruction group for causing the microcontroller 340 to control the power conversion device 100. For example, the control program is temporarily expanded in a random access memory (RAM, not illustrated) at the time of booting.

Hereinafter, a specific example of the operation of the motor drive unit 400 will be described, and a specific example of the operation of the power conversion device 100 will be mainly described.

The power conversion device 100 has power conversion modes including the first and second operation modes. Specifically, when the motor 200 is driven at a low speed, the power conversion device 100 converts power in the first operation mode. On the other hand, when the motor is driven at a high speed, the power conversion device 100 converts power in the second operation mode. In other words, the first operation mode is a mode corresponding to low speed driving of the motor 200, and the second operation mode is a mode corresponding to high speed driving of the motor 200.

Figure 4:
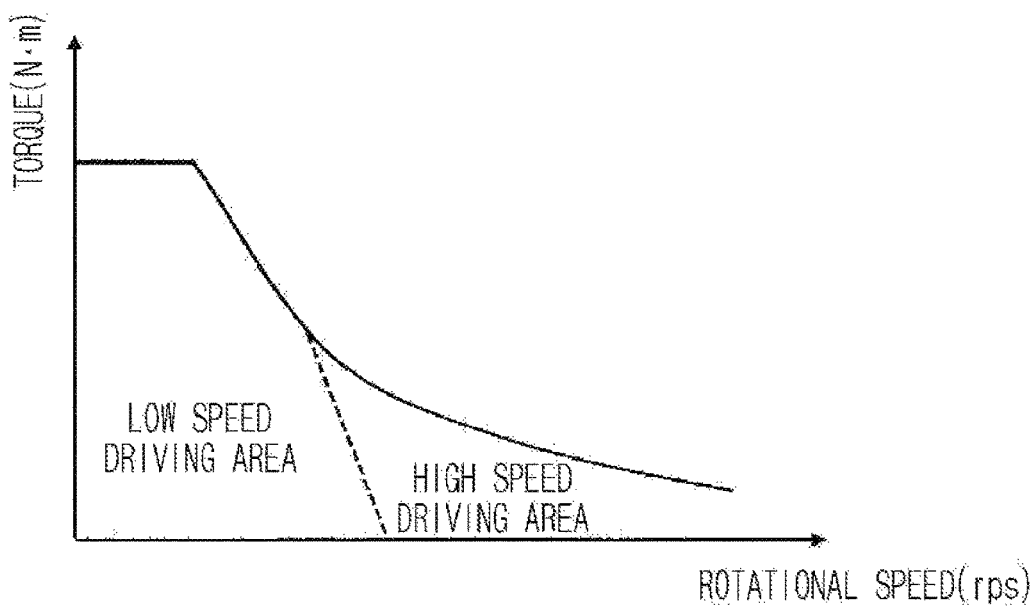
FIG. 4 is a graph illustrating the relationship between the number of rotations N (rps) per unit time and the torque T(N□m) of a motor.

FIG. 4 illustrates the relationship between the rotational speed (rps) per unit time and the torque T(N☐m) of the motor. FIG. 4 illustrates a so-called T-N curve. The low speed driving and high speed driving areas are generally represented as the areas shown.

Figure 5:
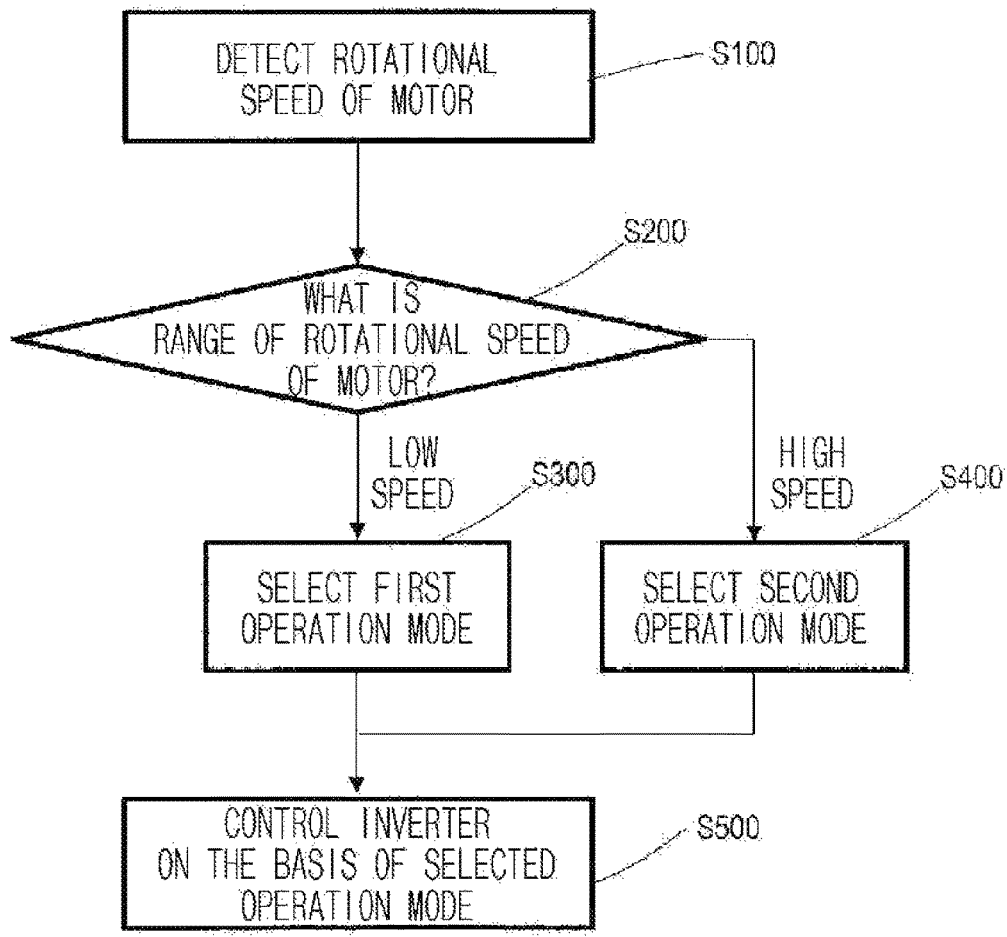
FIG. 5 is a flowchart illustrating an example of a process procedure of an operation of the power conversion device 100 according to the first preferred embodiment of the present invention.

FIG. 5 illustrates an example of a process procedure of an operation of the power conversion device 100.

The control circuit 300 of the motor drive unit 400 may detect a rotational speed of the motor 200 using various known methods (Step S100). The control circuit 300 determines whether the rotational speed of the motor 200 is a low speed or high speed on the basis of the T-N curve, for example (Step S200). When it is determined that the motor 200 is driven at a low speed, the control circuit 300 selects the first operation mode as the power conversion mode (Step S300), and when it is determined that the motor 200 is driven at a high speed, the control circuit 300 selects the second operation mode as the power conversion mode (Step S400). The control circuit 300 drives the motor 200 by controlling the first and second inverters on the basis of the selected operation mode (Step S500). Hereinafter, Steps S300 to S500 will be described in detail.

Hereinafter, a first operation mode will be described. When the motor 200 is driven at a low speed, in the first inverter 120, neutral point of the windings of each phase are formed at a connection node N1 (see FIG. 1) between the switching circuit 110 and the first inverter 120. In the present specification, the fact that a certain node serves as a neutral point is expressed as "a neutral point is configured." The power conversion device 100 may drive the motor 200 by performing power conversion using the second inverter 130 and the neutral point.

The control circuit 300 turns on the FETs 121H, 122H, and 123H and turns off the FETs 121L, 122L, and 123L in the first inverter 120. As a result, the connection node N1 on the high side serves as a neutral point N1. In other words, in the first inverter 120, the neutral point N1 is configured on the high side. The control circuit 300 also turns off the FET 111. As a result, the electrical connection between the power supply 101 and the first inverter 120 is interrupted, and it is possible to avoid drawing of the current from the power supply 101 to the first inverter 120 via the node N1.

Figure 6:
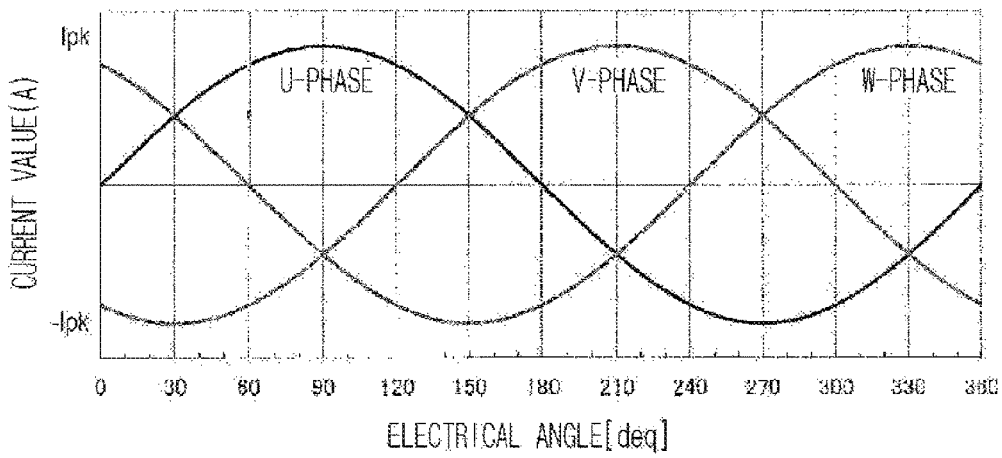
FIG. 6 is a graph illustrating a current waveform obtained by plotting current values flowing through U-phase, V-phase, and W-phase windings of a motor 200 when the power conversion device 100 is controlled in a first operation mode.
Figure 7:
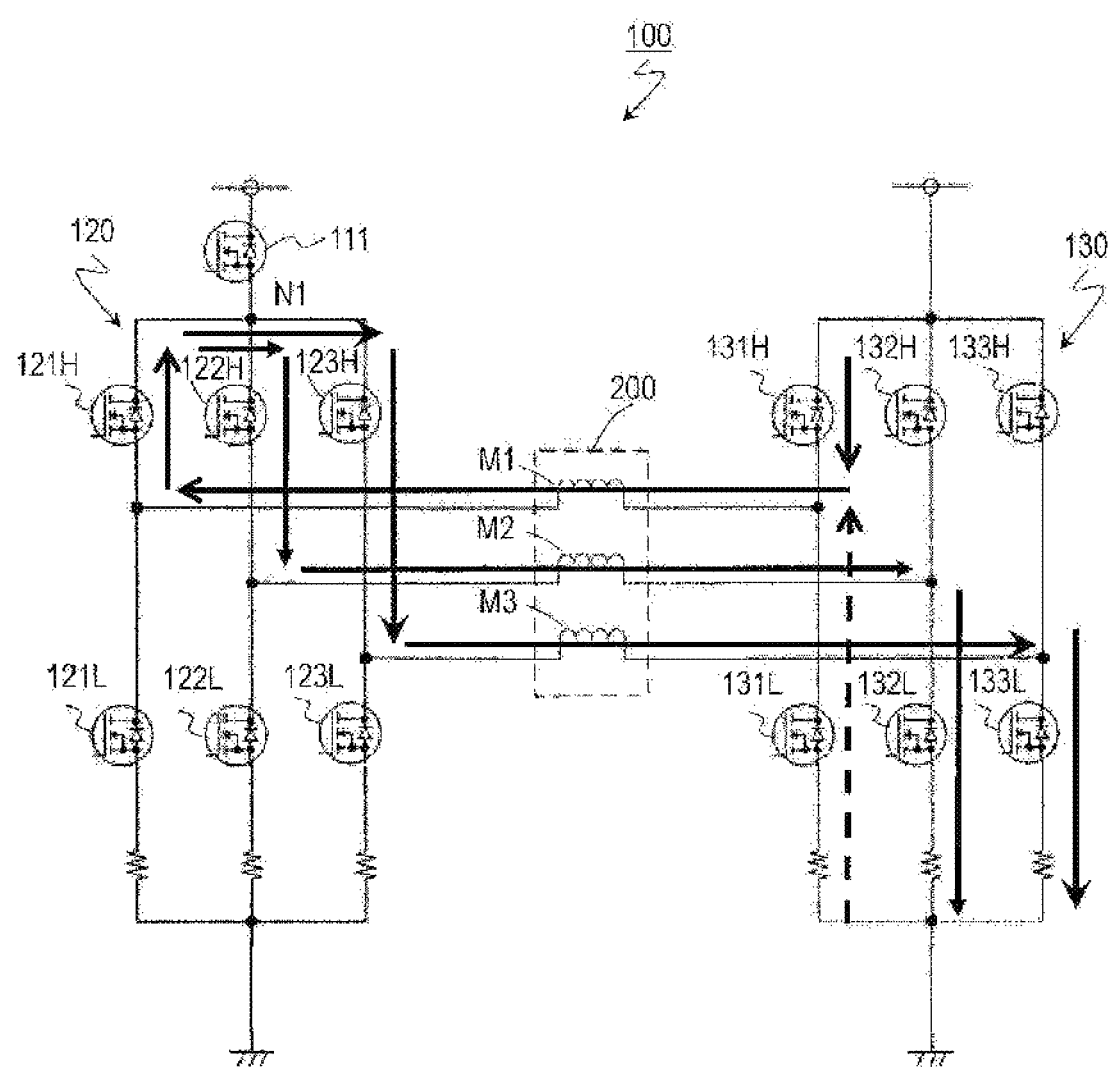
FIG. 7 is a schematic diagram illustrating the flow of current in the power conversion device 100 in the first operation mode.

FIG. 6 illustrates a current waveform (sine wave) obtained by plotting current values flowing through the U-phase, V-phase, and W-phase windings of the motor 200 when the power conversion device 100 is controlled in the first operation mode. The horizontal axis indicates a motor electrical angle (deg), and the vertical axis indicates a current value (A). In the current waveform in FIG. 6, the current value is plotted every electrical angle of 30 degrees. In addition to using the sine wave exemplified in FIG. 6, it is possible to drive the motor 200 using a square wave, for example. $I_{pk}$ in FIG. 6 represents the maximum current value (peak current value) of each phase. FIG. 7 schematically illustrates the flow of current in the power conversion device 100 in the first operation mode. In FIG. 7, for example, a current flow at a motor electrical angle of 270 degrees is illustrated. Each of the three solid lines represents a current flowing from the power supply 101 to the motor 200, and a broken line represents a regenerative current returning to the winding M1 of the motor 200.

In the state illustrated in FIG. 7, in the first inverter 120, the FETs 121H, 122H, and 123H are in the on-state, and the FETs 121L, 122L, and 123L are in the off-state. In the second inverter 130, the FETs 131H, 132L, and 133L are in the on-state, and the FETs 131L, 132H, and 133H are in the off-state.

The current flowing through the FET 131H of the second inverter 130 flows to the neutral point N1 via the winding M1 and the FET 121H of the first inverter 120. A part of the current flows to the winding M2 via the FET 122H, and the remaining current flows to the winding M3 via the FET 123H. The current flowing through the windings M2 and M3 returns to the second inverter 130 and flows to the GND. Also, in the freewheeling diode of the FET 131L, the regenerative current flows toward the winding M1 of the motor 200.

Table 1 exemplifies current values flowing to the terminal of the second inverter 130 for each electrical angle in the current waveform in FIG. 6. Specifically, Table 1 exemplifies a current value at every electrical angle of 30 degrees flowing through the terminals U_R, V_R, and W_R of the second inverter 130 (bridge circuit R). Here, regarding the bridge circuit L, the direction of the current flowing from the terminal of the bridge circuit L to the terminal of the bridge circuit R is defined as a positive direction. The current direction illustrated in FIG. 6 is in accordance with the above-described definition. Regarding the bridge circuit R, the direction of the current flowing from the terminal of the bridge circuit R to the terminal of the bridge circuit L is defined as a positive direction. Therefore, a phase difference between the current of the bridge circuit L and the current of the bridge circuit R is 180 degrees. In Table 1, the magnitude of the current value $I_1$ is $[(3)^{1/2}/2]*I_{pk}$, and the magnitude of the current value $I_2$ is $I_{pk}/2$. According to the definitions of the current directions, the positive/negative sign of the current value illustrated in FIG. 6 is opposite to that of the current value illustrated in Table 1 (phase difference 180 degrees).

TABLE 1

|  |  | Electrical degree [deg] | | | | | | | | | | | |
|---|---|---|---|---|---|---|---|---|---|---|---|---|---|
|  |  | 0 (360) | 30 | 60 | 90 | 120 | 150 | 180 | 210 | 240 | 270 | 300 | 330 |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
|  | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
|  | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electrical angle of 0 degrees, no current flows through the U-phase winding M1. A current having a magnitude $I_1$ flows from the bridge circuit R to the bridge circuit L through the V-phase winding M2, and a current having a magnitude $I_1$ flows from the bridge circuit L to the bridge circuit R through the W-phase winding M3.

At an electrical angle of 30 degrees, a current having a magnitude $I_2$ flows from the bridge circuit L to the bridge circuit R through the U-phase winding M1, a current having a magnitude $I_{pk}$ flows from the bridge circuit R to the bridge circuit L through the V-phase winding M2, and a current having a magnitude $I_2$ flows from the bridge circuit L to the bridge circuit R through the W-phase winding M3.

At an electrical angle of 60 degrees, a current having a magnitude $I_1$ flows from the bridge circuit L to the bridge circuit R through the U-phase winding M1, and a current having a magnitude $I_1$ flows from the bridge circuit R to the bridge circuit L through the V-phase winding M2. No current flows through the W-phase winding M3.

At an electrical angle of 90 degrees, a current having a magnitude $I_{pk}$ flows from the bridge circuit L to the bridge circuit R through the U-phase winding M1, a current having a magnitude $I_2$ flows from the bridge circuit R to the bridge circuit L through the V-phase winding M2, and a current having a magnitude $I_2$ flows from the bridge circuit R to the bridge circuit L through the W-phase winding M3.

At an electrical angle of 120 degrees, a current having a magnitude $I_1$ flows from the bridge circuit L to the bridge circuit R through the U-phase winding M1, and a current having a magnitude $I_1$ flows from the bridge circuit R to the bridge circuit L through the W-phase winding M3. No current flows through the V-phase winding M2.

At an electrical angle of 150 degrees, a current having a magnitude $I_2$ flows from the bridge circuit L to the bridge circuit R through the U-phase winding M1, a current having a magnitude $I_2$ flows from the bridge circuit L to the bridge circuit R through the V-phase winding M2, and a current having a magnitude $I_{pk}$ flows from the bridge circuit R to the bridge circuit L through the W-phase winding M3.

At an electrical angle of 180 degrees, no current flows through the U-phase winding M1. A current having a magnitude $I_1$ flows from the bridge circuit L to the bridge circuit R through the V-phase winding M2, and a current having a magnitude $I_1$ flows from the bridge circuit R to the bridge circuit L through the W-phase winding M3.

At an electrical angle of 210 degrees, a current having a magnitude $I_2$ flows from the bridge circuit R to the bridge circuit L through the U-phase winding M1, a current having a magnitude $I_{pk}$ flows from the bridge circuit L to the bridge circuit R through the V-phase winding M2, and a current having a magnitude $I_2$ flows from the bridge circuit R to the bridge circuit L through the W-phase winding M3.

At an electrical angle of 240 degrees, a current having a magnitude $I_1$ flows from the bridge circuit R to the bridge circuit L through the U-phase winding M1, and a current having a magnitude $I_1$ flows from the bridge circuit L to the bridge circuit R through the V-phase winding M2. No current flows through the W-phase winding M3.

At an electrical angle of 270 degrees, a current having a magnitude $I_{pk}$ flows from the bridge circuit R to the bridge circuit L through the U-phase winding M1, a current having a magnitude $I_2$ flows from the bridge circuit L to the bridge circuit R through the V-phase winding M2, and a current having a magnitude $I_2$ flows from the bridge circuit L to the bridge circuit R through the W-phase winding M3.

At an electrical angle of 300 degrees, a current having a magnitude $I_1$ flows from the bridge circuit R to the bridge circuit L through the U-phase winding M1, and a current having a magnitude $I_1$ flows from the bridge circuit L to the bridge circuit R through the W-phase winding M3. No current flows through the V-phase winding M2.

At an electrical angle of 330 degrees, a current having a magnitude $I_2$ flows from the bridge circuit R to the bridge circuit L through the U-phase winding M1, a current having a magnitude $I_2$ flows from the bridge circuit R to the bridge circuit L through the V-phase winding M2, and a current having a magnitude $I_{pk}$ flows from the bridge circuit L to the bridge circuit R through the W-phase winding M3.

The sum of the current flowing into the neutral point N1 and the current flowing out from the neutral point N1 is always "0" for every electrical angle. For example, the control circuit 300 controls the switching operation of each FET of the bridge circuit R by vector control by which the current waveform illustrated in FIG. 6 is obtained.

Since the power supply 101 and the first inverter 120 are electrically disconnected due to the FET 111 of the switching circuit 110, no current flows from the power supply 101 to the first inverter 120. Also, since all of the low side switching elements 121L, 122L, and 123L are turned off, no current flows to the GND at the first inverter 120 side. As a result, it is possible to suppress power loss, and suitable current control becomes possible by forming a closed loop of a drive current.

Since high torque is required when the motor is operated at a low speed, a large current flows to the inverter. As a result, power loss in each switching element (including loss due to the switching operation) inevitably increases. When the number of FETs used in the inverter increases, the overall power loss of the inverter further increases. For example, the motor drive unit 400 may be modularized as a power pack. In that case, heat generated due to power consumption by the FET of the inverter is transferred to the power pack, and heat generation of the power pack may be a problem in some cases. Therefore, during low speed driving, for example, it is desirable to reduce the number of FETs performing the switching operation.

According to the first operation mode, the switching operation of each FET of the first inverter 120 does not occur during low speed driving. Also, no current flows to the low side switching elements 121L, 122L, and 123L which are in the off-state. Therefore, it is possible to effectively suppress power loss in the first inverter 120. In other words, by causing more power loss due to the switching operation in the second inverter 130 on one side, power loss due to any FET among the two inverters can be further suppressed.

Figure 8:
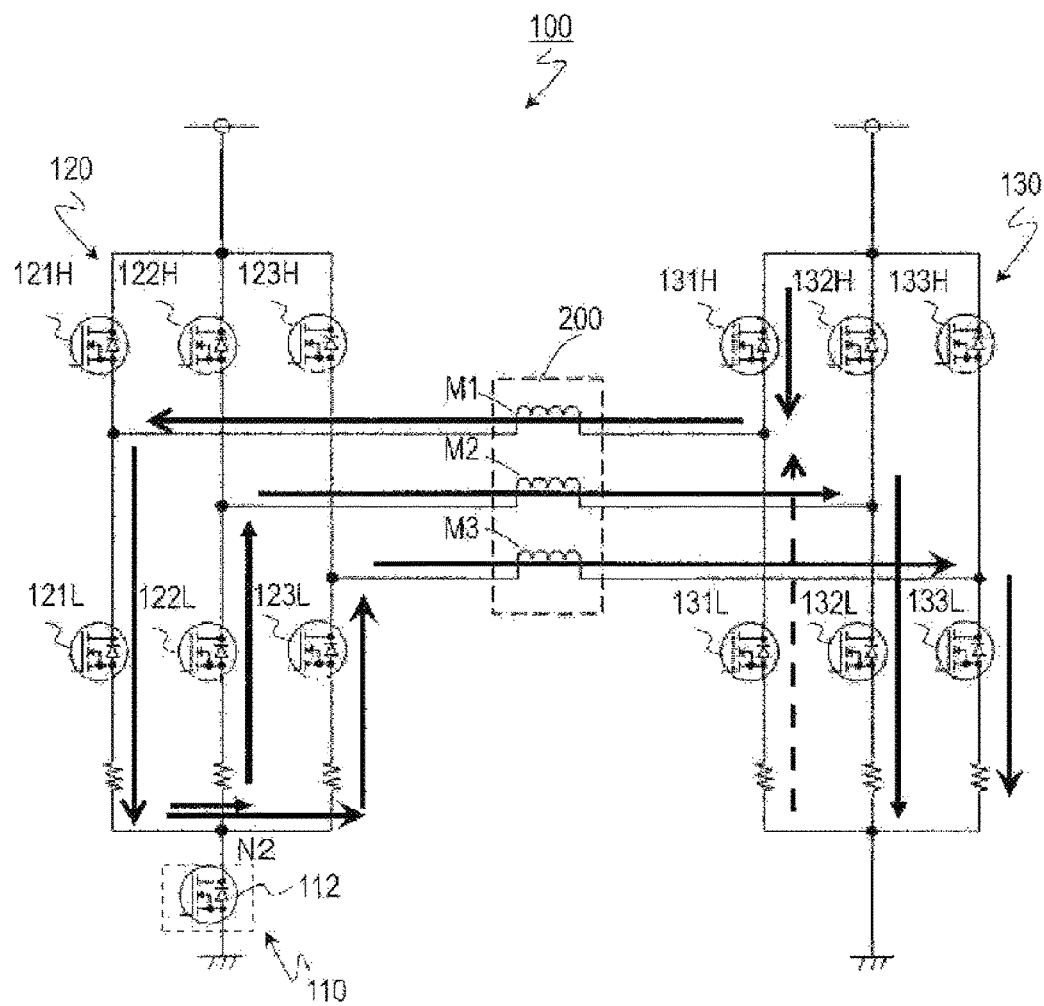
FIG. 8 is a circuit diagram illustrating a circuit configuration of the power conversion device 100 in which a switching circuit 110 is disposed on a GND side of a first inverter 120.

FIG. 8 schematically illustrates a circuit configuration of the power conversion device 100 in which the switching circuit 110 is disposed at the GND side of the first inverter 120. As illustrated, the switching circuit 110 may be disposed between the first inverter 120 and the GND. The switching circuit 110 has a second switch element 112. In the present specification, the switching circuit 110 disposed at the GND side is referred to as "GND-side switching circuit" in some cases. The switching circuit 110 switches between whether the first inverter 120 and the GND are connected or disconnected.

The control circuit 300 turns on the FETs 121L, 122L, and 123L and turns off the FETs 121H, 122H, and 123H in the first inverter 120. As a result, a connection node N2 at the low side serves as a neutral point N2. In other words, in the first inverter 120, the neutral point N2 is configured at the low side. Also, the control circuit 300 turns off the FET 112 of the switching circuit 110. As a result, the electrical connection between the first inverter 120 and the GND is interrupted, and it is possible to prevent the flow of current from the first inverter 120 to the GND via the node N2.

For example, the control circuit 300 controls the switching operation of each FET of the bridge circuit R by vector control by which the current waveform illustrated in FIG. 6 is obtained. As a result, the power conversion device 100 may drive the motor 200 by using the second inverter 130 and the neutral point N2 at the low side of the first inverter 120.

In FIG. 8, for example, a current flow at a motor electrical angle of 270 degrees is illustrated. Each of the three solid lines represents a current flowing from the power supply 101 to the motor 200, and a broken line represents a regenerative current returning to the winding M1 of the motor 200. In the first inverter 120, the FETs 121H, 122H, and 123H are in an off-state, and the FETs 121L, 122L, and 123L are in an on-state. In the second inverter 130, the FETs 131H, 132L, and 133L are in an on-state, and the FETs 131L, 132H, and 133H are in an off-state.

The current flowing through the FET 131H of the second inverter 130 flows to the neutral point N2 via the winding M1 and the FET 121L of the first inverter 120. A part of the current flows to the winding M2 via the FET 122L, and the remaining current flows to the winding M3 via the FET 123L. The current flowing through the windings M2 and M3 returns to the second inverter 130 and flows to the GND. Also, in the freewheeling diode of the FET 131L, the regenerative current flows toward the winding M1 of the motor 200.

Power loss can be suppressed even when the GND-side switching circuit is used instead of the power-supply-side switching circuit, and suitable current control becomes possible by forming a closed loop of a drive current. In addition, for example, it is possible to improve countermeasures for the above-described heat generation of the power pack.

Hereinafter, a second operation mode will be described. When the motor 200 is driven at a high speed, the power conversion device 100 may drive the motor 200 by performing power conversion using both the first and second inverters 120 and 130.

Refer back to FIG. 7.

The control circuit 300 turns on the FET 111 of the switching circuit 110. As a result, the power supply 101 and the first inverter 120 are electrically connected. In the connection state, the control circuit 300 drives the motor 200 by performing three-phase energization control using both the first and second inverters 120 and 130. Three-phase energization control refers to performing switching control of the FETs of the first inverter 120 and the FETs of the second inverter 130 with opposite phases (phase difference=180 degrees). For example, focusing on the H bridge including the FETs 121L, 121H, 131L, and 131H, the FET 131L is turned off when the FET 121L is turned on, and the FET 131L is turned on when the FET 121L is turned off. Likewise, the FET 131H is turned off when the FET 121H is turned on, and the FET 131H is turned on when the FET 121H is turned off.

Figure 9:
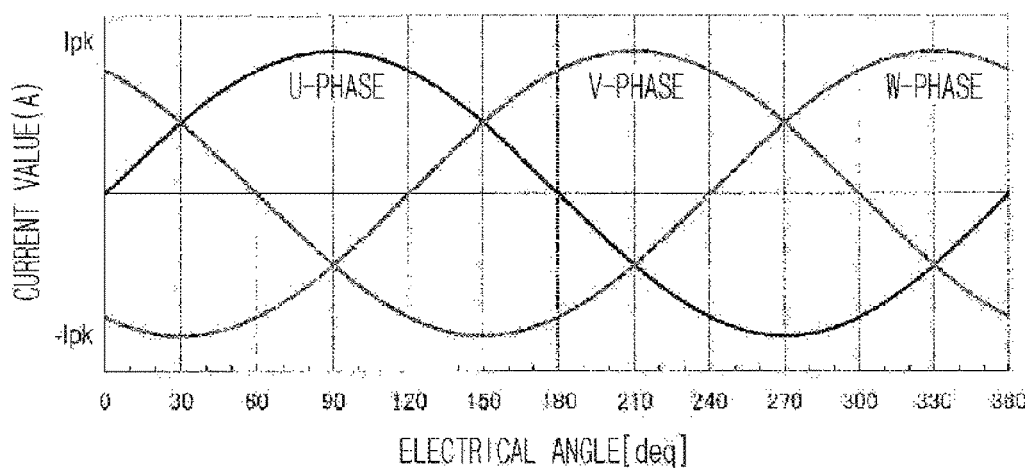
FIG. 9 is a graph illustrating a current waveform obtained by plotting current values flowing through U-phase, V-phase, and W-phase windings of the motor 200 when the power conversion device 100 is controlled according to three-phase energization control.

FIG. 9 exemplifies a current waveform obtained by plotting current values flowing through the U-phase, V-phase, and W-phase windings of the motor 200 when the power conversion device 100 is controlled according to the three-phase energization control. The horizontal axis indicates a motor electrical angle (deg), and the vertical axis indicates a current value (A). In the current waveform in FIG. 9, the current value is plotted every electrical angle of 30 degrees. In addition to using the sine wave exemplified in FIG. 9, it is possible to drive the motor 200 using a square wave, for example.

Table 2 shows current values flowing to the terminals of each inverter for each electrical angle in the sine wave in FIG. 9. Specifically, Table 2 exemplifies a current value at every electrical angle of 30 degrees flowing through the terminals U_L, V_L, and W_L of the first inverter 120 (bridge circuit L) and a current value at every electrical angle of 30 degrees flowing through the terminals U_R, V_R, and W_R of the second inverter 130 (bridge circuit R). The definitions of the current directions are the same as those described above.

TABLE 2

| | | Electrical degree [deg] | | | | | | | | | | |
|---|---|---|---|---|---|---|---|---|---|---|---|---|
| | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at an electrical angle of 30 degrees, a current having a magnitude $I_2$ flows from the bridge circuit L to the bridge circuit R through the U-phase winding M1, a current having a magnitude $I_{pk}$ flows from the bridge circuit R to the bridge circuit L through the V-phase winding M2, and a current having a magnitude $I_2$ flows from the bridge circuit L to the bridge circuit R through the W-phase winding M3. At an electrical angle of 60 degrees, a current having a magnitude $I_1$ flows from the bridge circuit L to the bridge circuit R through the U-phase winding M1, and a current having a magnitude $I_1$ flows from the bridge circuit R to the bridge circuit L through the V-phase winding M2. No current flows through the W-phase winding M3. In the three-phase energization control, the sum of the currents flowing through the three-phase windings which takes the current directions into consideration is always "0" for every electrical angle.

For example, the control circuit 300 controls the switching operation of each FET of the bridge circuits L and R by the three-phase energization control by using vector control by which the current waveform illustrated in FIG. 9 is obtained.

As shown in Tables 1 and 2, it can be seen that the motor current flowing through the motor 200 between the first and second operation modes does not change for every electrical angle. In other words, the assist torque of the motor does not change between the two modes.

A large counter electromotive force is generated in the motor when the motor is driven at a high speed. Therefore, it is necessary to increase the voltage of each phase. According to the second operation mode, during high speed driving, the power conversion device 100 may perform the three-phase energization control by using both the first and second inverters 120 and 130. As a result, it is possible to increase the voltage of each phase, thereby causing an expansion of the range of high-speed driving.

According to the present preferred embodiment, it is possible to cause efficient driving of the motor 200 while suppressing power loss due to the inverters over a wide range from low-speed driving to high-speed driving.

A power conversion device 100A according to the present preferred embodiment will be described with reference to FIGS. 10 to 12B.

The power conversion device 100A according to the present preferred embodiment is different from the power conversion device 100 according to the first preferred embodiment in that the power conversion device 100A further includes a switching circuit 110 for the second inverter 130. Hereinafter, differences between the first preferred embodiment and the present preferred embodiment will be mainly described.

Figure 10:
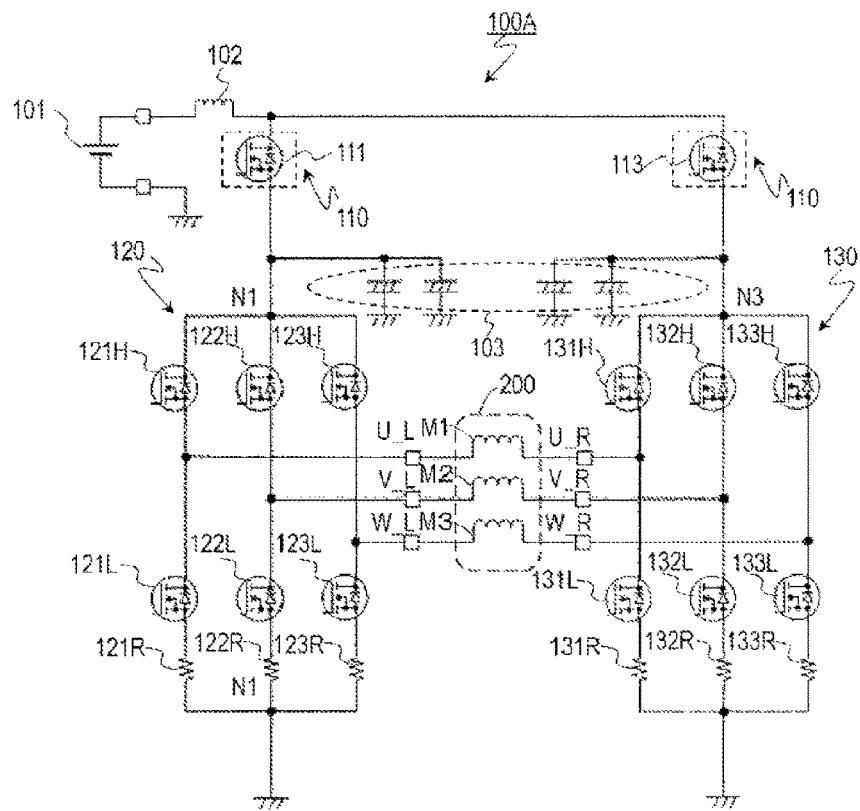
FIG. 10 is a circuit diagram illustrating a circuit configuration of a power conversion device 100A according to a second preferred embodiment of the present invention.

FIG. 10 schematically illustrates a circuit configuration of the power conversion device 100A according to the present preferred embodiment.

The power conversion device 100A has two switching circuits 110 for the first and second inverters 120 and 130. The switching circuit 110 for the first inverter 120 has the FET 111, and the switching circuit 110 for the second inverter 130 has a third switch element (FET) 113. The FET 113 switches between whether the second inverter 130 and the power supply 101 are connected or disconnected.

Hereinafter, a specific example of an operation of the motor drive unit 400 according to the present preferred embodiment will be described, and a specific example of an operation of the power conversion device 100A will be mainly described.

Figure 11:
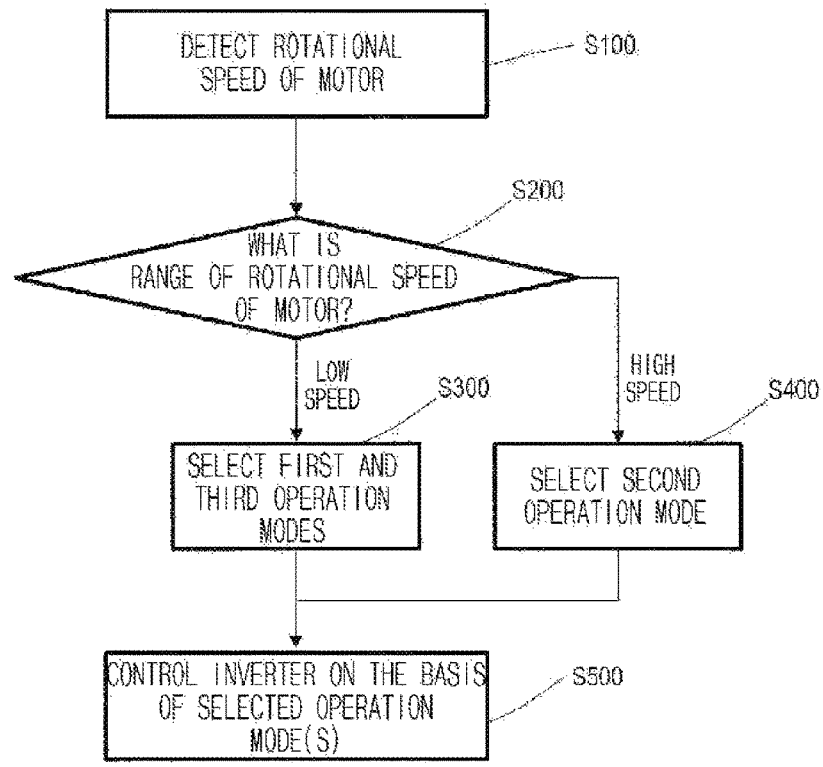
FIG. 11 is a flowchart illustrating an example of a process procedure of an operation of the power conversion device 100A according to the second preferred embodiment of the present invention.

FIG. 11 illustrates an example of a process procedure of an operation of the power conversion device 100A.

The power conversion device 100A has power conversion modes including first, second, and third operation modes. In Step S300, when it is determined that the motor 200 is being driven at a low speed, the control circuit 300 selects the first and third operation modes as power conversion modes. The first and second operation modes are the same as those described above in the first preferred embodiment. The third operation mode is a new mode which corresponds to low speed driving of the motor 200 as the first operation mode.

Hereinafter, a third operation mode will be described. When the motor 200 is driven at a low speed, during the first operation mode, the control circuit 300 turns off the FET 111, turns on the FET 113, and turns on the FETs 121H, 122H, and 123H and turns off the FETs 121L, 122L, and 123L in the first inverter 120. As a result, in the first inverter 120, the neutral point N1 is configured at the high side. The power conversion device 100A drives the motor 200 by performing power conversion using the second inverter 130 and the neutral point N1 of the first inverter 120.

On the other hand, during the third operation mode, the control circuit 300 turns on the FET 111, turns off the FET 113, and turns on the FETs 131H, 132H, and 133H and turns off the FETs 131L, 132L, and 133L in the second inverter 130. As a result, in the second inverter 130, a neutral point N3 is configured at the high side. The power conversion device 100A drives the motor 200 by performing power conversion using the first inverter 120 and the neutral point N3 of the second inverter 130.

For example, the power conversion device 100A may convert power using the first and second inverters 120 and 130 while alternately switching between the first and third operation modes. For example, consider drive sequences including first to Nth periods (where N is an integer). For example, according to the driving sequences, the control circuit 300 may convert power by the first operation mode during odd-numbered periods (the first, third, fifth, . . . periods) and may convert power by the third operation mode during even-numbered periods (the second, fourth, sixth, . . . periods).

For example, the length of each period of the first to Nth periods may be the same or different (may be random). Also, for example, the length of each period of the odd-numbered periods may be the same or different. For example, the length of each period of the even-numbered periods may be the same or different. In this way, the length of each period may be arbitrarily set according to product specifications and the like.

When the motor 200 is driven at a high speed, as in the first preferred embodiment, the power conversion device 100A may convert power in the second operation mode (Step S400 in FIG. 11).

Figure 12A:
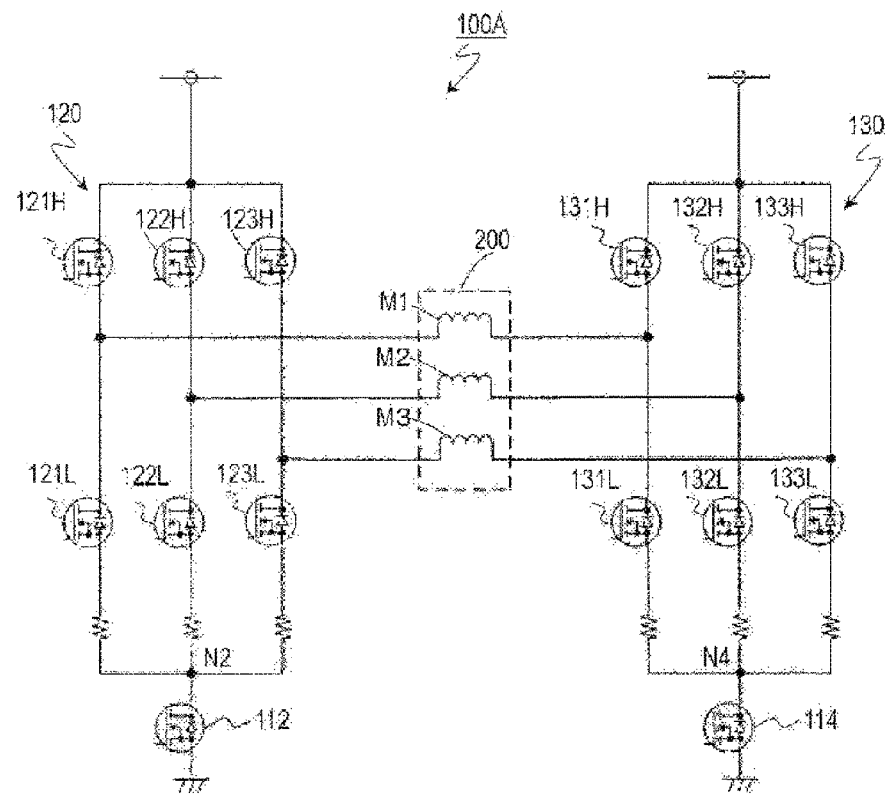
FIG. 12A is a circuit diagram illustrating a variation of a circuit configuration of the power conversion device 100A according to the second preferred embodiment of the present invention.
Figure 12B:
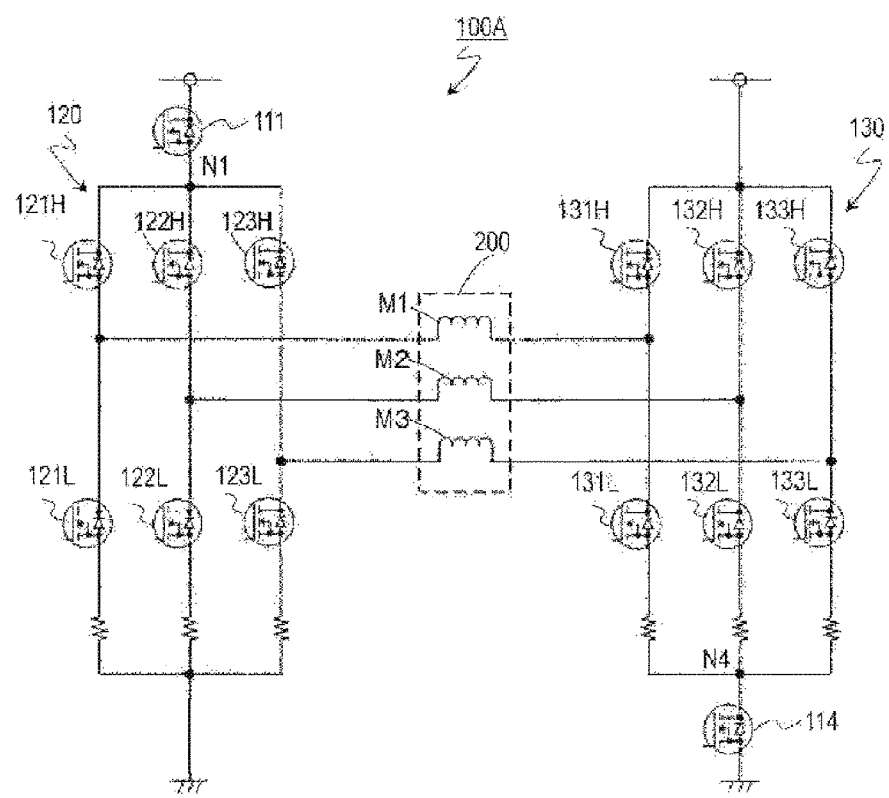
FIG. 12B is a circuit diagram illustrating a variation of a circuit configuration of the power conversion device 100A according to the second preferred embodiment of the present invention.

FIGS. 12A and 12B schematically illustrate variations of the circuit configuration of the power conversion device 100A according to the present preferred embodiment. The power conversion device 100A of the present preferred embodiment may have one switching circuit 110 for the first inverter 120 and one switching circuit 110 for the second inverter 130. Therefore, for example, the two switching circuits 110 are arranged as illustrated in FIGS. 12A and 12B. Hereinafter, operations according to variations of the power conversion device 100A will be described using the circuit configuration having two switching circuits 110, as illustrated in FIG. 2A, as an example.

According to the power conversion device 100A illustrated in FIG. 12A, when the motor 200 is driven at a low speed, during the first operation mode, the control circuit 300 turns off the FET 112, turns on a fourth switch element (FET) 114, and turns off the FETs 121H, 122H, and 123H and turns on the FETs 121L, 122L, and 123L in the first inverter 120. As a result, in the first inverter 120, the neutral point N2 is configured at the low side. The power conversion device 100A drives the motor 200 by performing power conversion using the second inverter 130 and the neutral point N2 of the first inverter 120.

On the other hand, during the third operation mode, the control circuit 300 turns on the FET 112, turns off the FET 114, and turns off the FETs 131H, 132H, and 133H and turns on the FETs 131L, 132L, and 133L in the second inverter 130. As a result, in the second inverter 130, a neutral point N4 is configured at the low side. The power conversion device 100A drives the motor 200 by performing power conversion using the first inverter 120 and the neutral point N4 of the second inverter 130.

According to the present preferred embodiment and the variations, since the first and second inverters 120 and 130 can be switched and driven, power loss which only occurs from an inverter on one side can be dispersed over the inverters on both sides. As a result, for example, localization of the above-described heat generation of the power pack can be suppressed. As a result, an expansion of the motor driving range and more effective countermeasures for the heat generation can be realized.

A power conversion device 100B according to the present preferred embodiment is different from the power conversion device 100 according to the first preferred embodiment in that the power conversion device 100B has a power-supply-side switching circuit and a GND-side switching circuit for the first inverter 120. Hereinafter, differences from the power conversion device 100 according to the first preferred embodiment will be mainly described.

Figure 13:
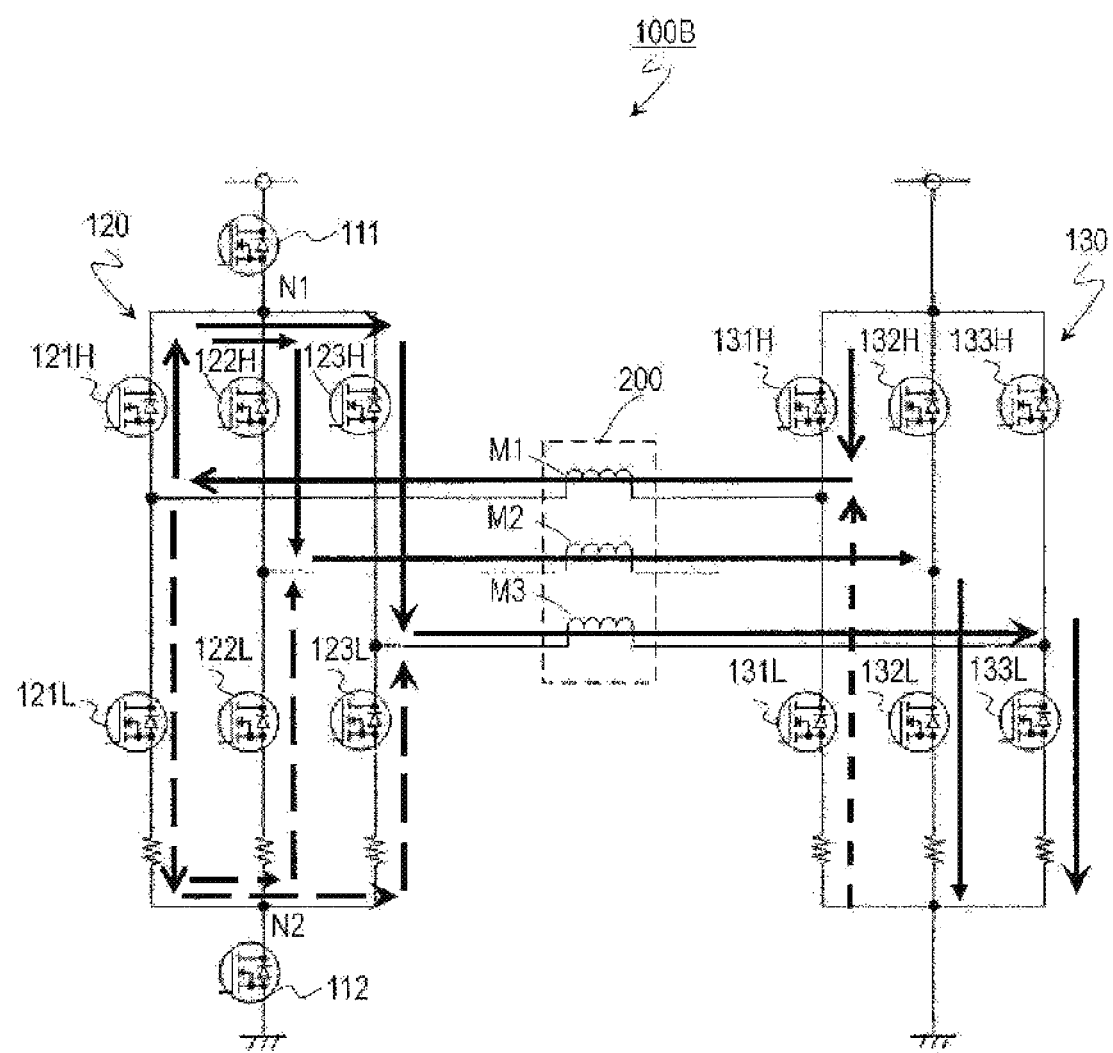
FIG. 13 is a circuit diagram illustrating a circuit configuration of a power conversion device 100B according to a third preferred embodiment of the present invention.

FIG. 13 schematically illustrates a circuit configuration of the power conversion device 100B according to the present preferred embodiment.

The power conversion device 100B has a switching circuit 110 including FETs 111 and 112 for the first inverter 120.

Like the power conversion device 100 according to the first preferred embodiment, the power conversion device 100B has power conversion modes including first and second operation modes. The control circuit 300 (see FIG. 3) selects the first operation mode as a power conversion mode when it is determined that the motor 200 is being driven at a low speed and selects the second operation mode as a power conversion mode when it is determined that the motor 200 is being driven at a high speed.

When the motor 200 is driven at a low speed, during the first operation mode, the control circuit 300 turns off the FETs 111 and 112 and turns on all of the high side switching elements and low side switching elements of the first inverter 120. As a result, as illustrated in FIG. 13, the neutral point N1 is configured at the high side of the first inverter, and the neutral point N2 is configured at the low side thereof. The power conversion device 100B drives the motor 200 by performing power conversion using the second inverter 130 and the two neutral points N1 and N2 of the first inverter 120.

During the second operation mode, the control circuit 300 turns on the FETs 111 and 112 and performs power conversion by the three-phase energization control using the first and second inverters 120 and 130.

According to the present preferred embodiment, as illustrated in FIG. 13, the current may be dispersed to the high side and the low side by the two neutral points N1 and N2. By eliminating power loss due to the switching operation of the FET in the first inverter 120, it is possible to reduce power loss due to energization resistance of any FET among the two inverters.

Generally, vehicles such as an automobile have an electric power steering device. An electric power steering device generates auxiliary torque for assisting a steering torque of a steering system generated by a driver operating a steering handle. The auxiliary torque is generated by an auxiliary torque mechanism so that a burden on the driver's operation is reduced. For example, the auxiliary torque mechanism includes a steering torque sensor, an ECU, a motor, a deceleration mechanism, and the like. The steering torque sensor detects the steering torque in the steering system. The ECU generates a driving signal on the basis of a detection signal of the steering torque sensor. The motor generates the auxiliary torque according to the steering torque on the basis of the driving signal and transmits the auxiliary torque to the steering system via the deceleration mechanism.

Figure 14:
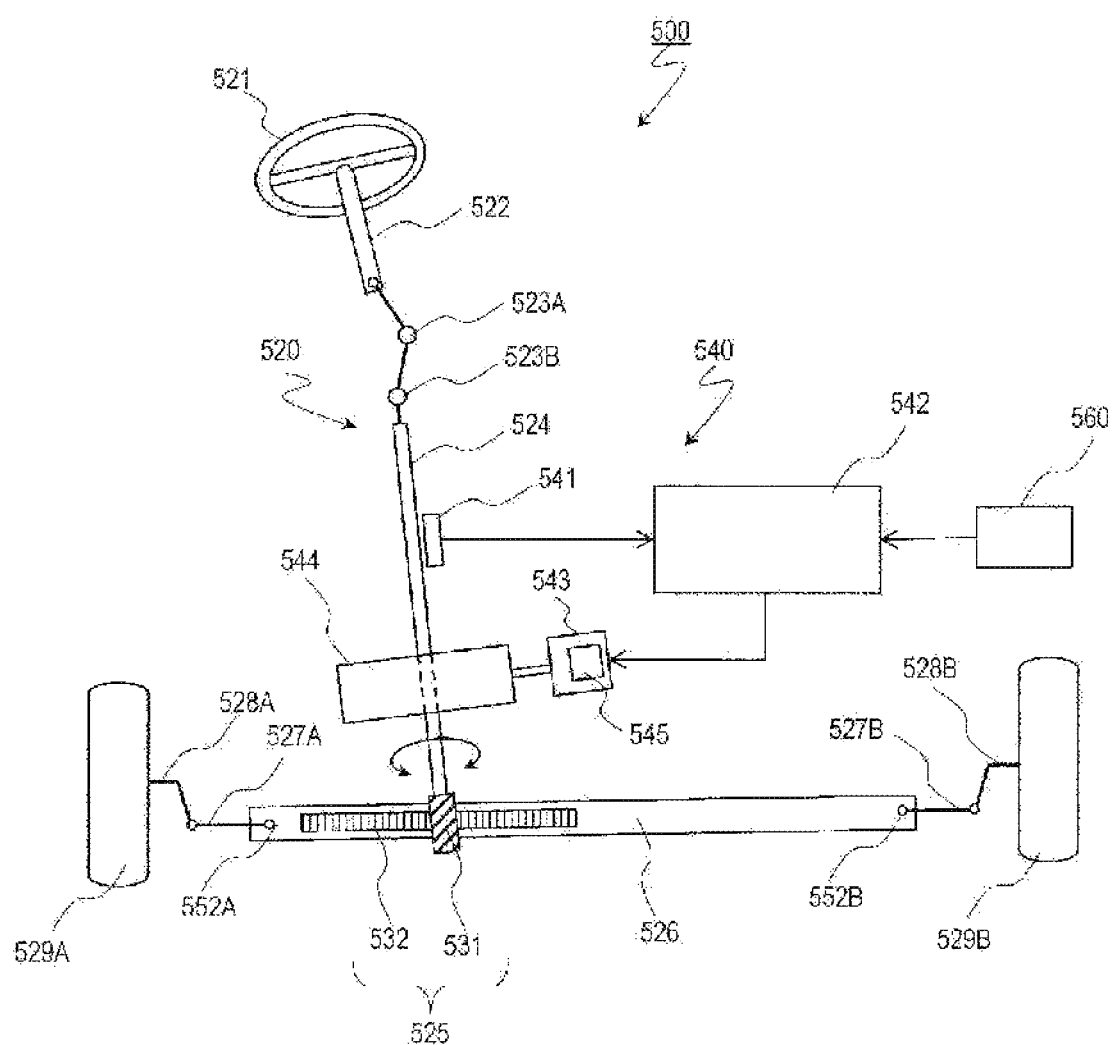
FIG. 14 is a schematic diagram illustrating a typical configuration of an electric power steering device 500 according to a fourth preferred embodiment of the present invention.

The motor drive unit 400 of the present disclosure is suitably used in an electric power steering device. FIG. 14 schematically illustrates a typical configuration of an electric power steering device 500 according to the present preferred embodiment. The electric power steering device 500 has a steering system 520 and an auxiliary torque mechanism 540.

For example, the steering system 520 may include a steering handle 521, a steering shaft 522 (also referred to as "steering column"), universal joints 523A and 523B, a rotation shaft 524 (also referred to as "pinion shaft" or "input shaft"), a rack-and-pinion mechanism 525, a rack shaft 526, left and right ball joints 552A and 552B, tie rods 527A and 527B, knuckles 528A and 528B, and left and right steering wheels (for example, left and right front wheels) 529A and 529B. The steering handle 521 is connected to the rotation shaft 524 via the steering shaft 522 and the universal joints 523A and 523B. The rack shaft 526 is connected to the rotation shaft 524 via the rack-and-pinion mechanism 525. The rack-and-pinion mechanism 525 has a pinion 531 installed at the rotation shaft 524 and a rack 532 installed at the rack shaft 526. To a right end of the rack shaft 526, a right steering wheel 529A is connected via the ball joint 552A, the tie rod 527A, and the knuckle 528A in this order. Like the right side, a left steering wheel 529B is connected to a left end of the rack shaft 526 via the ball joint 552B, the tie rod 527B, and the knuckle 528B in this order. Here, the right side and the left side respectively correspond to the right side and the left side seen from the driver's seat.

According to the steering system 520, steering torque is generated by the driver operating the steering handle 521, and the steering torque is transmitted to the left and right steering wheels 529A and 529B via the rack-and-pinion mechanism 525. As a result, the driver may operate the left and right steering wheels 529A and 529B.

For example, the auxiliary torque mechanism 540 may include a steering torque sensor 541, an ECU 542, a motor 543, a deceleration mechanism 544, and a power conversion device 545. The auxiliary torque mechanism 540 gives the auxiliary torque to the steering system 520 ranging from the steering handle 521 to the left and right steering wheels 529A and 529B. The auxiliary torque is referred to as "additional torque" in some cases.

The control circuit 300 according to the present disclosure may be used as the ECU 542, and the power conversion device 100 according to the present disclosure may be used as the power conversion device 545. Also, the motor 543 corresponds to the motor 200 in the present disclosure. The motor drive unit 400 according to the present disclosure may be suitably used as an electromechanically integrated motor capable of being configured by the ECU 542, the motor 543, and the power conversion device 545.

The steering torque sensor 541 detects steering torque of the steering system 520 applied by the steering handle 521. The ECU 542 generates a driving signal for driving the motor 543 on the basis of a detection signal (hereinafter referred to as "torque signal") from the steering torque sensor 541. The motor 543 generates the auxiliary torque according to the steering torque on the basis of the driving signal. The auxiliary torque is transmitted to the rotation shaft 524 of the steering system 520 via the deceleration mechanism 544. For example, the deceleration mechanism 544 is a worm gear mechanism. The auxiliary torque is also transmitted from the rotation shaft 524 to the rack-and-pinion mechanism 525.

The electric power steering device 500 may be classified into a pinion assist type, a rack assist type, a column assist type, and the like depending on a place where the auxiliary torque is applied to the steering system 520. FIG. 14 illustrates a pinion assist type electric power steering device 500. However, the electric power steering device 500 is also applied to a rack assist type, a column assist type, and the like.

For example, in addition to the torque signal, a vehicle speed signal may also be input to the ECU 542. An external device 560 is, for example, a vehicle speed sensor. Alternatively, for example, the external device 560 may be another ECU capable of communicating via an in-vehicle network such as a controller area network (CAN). A microcontroller of the ECU 542 may perform vector control or PWM control of the motor 543 on the basis of the torque signal, the vehicle speed signal, and the like.

The ECU 542 sets a target current value on the basis of at least the torque signal. It is desirable that the ECU 542 sets a target current value by taking into consideration a vehicle speed signal detected by a vehicle speed sensor and a rotation signal of a rotor detected by an angle sensor. The ECU 542 may control a driving signal, that is, a drive current, of the motor 543 so that an actual current value detected by a current sensor (not illustrated) corresponds to the target current value.

According to the electric power steering device 500, by using combined torque obtained by adding the auxiliary torque of the motor 543 to the steering torque of the driver, the left and right steering wheels 529A and 529B may be operated by the rack shaft 526. Particularly, by using the motor drive unit 400 of the present disclosure as the above-described electromechanically integrated motor, an electric power steering device having a motor drive unit capable of improving countermeasures for heat generation and performing suitable current control is provided.

Embodiments of the present disclosure can be widely used in various devices having various motors such as a vacuum cleaner, a dryer, a ceiling fan, a washing machine, a refrigerator, and an electric power steering device.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A power conversion device which converts power from a power supply into power that is to be supplied to a motor with n-phase windings, where n is an integer of 3 or greater, the power conversion device comprising:
a first inverter connected to first ends of the n-phase windings, the first inverter including a first bridge circuit;
a second inverter connected to second ends of the n-phase windings, the second inverter including a second bridge circuit;
a first switching circuit including a first switch to switch between whether the first inverter and the power supply are connected or disconnected; and
a second switching circuit including a second switch to switch between whether the second inverter and the power supply are connected or disconnected, or to switch between whether the second inverter and the ground are connected or disconnected; wherein
the power conversion device has a first operation mode in which power conversion is performed using the second inverter and a first neutral point in the windings of each phase of the first inverter when the motor is driven in a low speed driving area, and a second operation mode in which power conversion is performed by n-phase energization control of the first and second inverters when the motor is driven in a high speed driving area;
the power conversion device further has a third operation mode in which, when the motor is driven in the low speed driving area, power conversion is performed using the first inverter and a second neutral point in the windings of each phase of the second inverter;
each of the first bridge circuit and the second bridge circuit includes n legs each including a low side switch and a high side switch;
in the first operation mode, the first switch is turned off, the second switch is turned on, and the high side switches are turned on and the f-low side switches are turned off in the first bridge circuit; and
in the third operation mode, the first switch is turned on, the second switch is turned off, and the high side switches are turned on and the low side switches are turned off in the second bridge circuit.

2. The power conversion device according to claim 1, wherein, when the motor is driven in the low speed driving area, switching is performed between power conversion by the first operation mode and power conversion by the third operation mode.

3. The power conversion device according to claim 1, wherein the power supply is a single power supply.

4. A motor driver comprising:
the motor according to claim 1;
the power conversion device according to claim 1; and
a control circuit to control the power conversion device.

5. An electric power steering device comprising the motor driver according to claim 4.

6. A power conversion device which converts power from a power supply into power that is to be supplied to a motor with n-phase windings, where n is an integer of 3 or greater, the power conversion device comprising:
a first inverter connected to first ends of the n-phase windings, the first inverter including a first bridge circuit;
a second inverter connected to second ends of the n-phase windings, the second inverter including a second bridge circuit; and
a first switching circuit including a first switch to switch between whether the first inverter and the power supply are connected or disconnected and a second switch to switch between whether the first inverter and a ground are connected or disconnected; wherein
the power conversion device has a first operation mode in which power conversion is performed using the second inverter and a first neutral point in the windings of each phase of the first inverter when the motor is driven in a low speed driving area, and a second operation mode in which power conversion is performed by n-phase energization control of the first and second inverters when the motor is driven in a high speed driving area;
each of the first bridge circuit and the second bridge circuit includes n legs each including a low side switch and a high side switch; and in the first operation mode, the first switch and the second switches are turned off, and the high side switches and the low side switches are turned on in the first bridge circuit.

7. The power conversion device according to claim 6, wherein the power supply is a single power supply.

8. A motor driver comprising:
the motor according to claim 6;
the power conversion device according to claim 6; and
a control circuit to control the power conversion device.

9. An electric power steering device comprising the motor driver according to claim 8.

10. A power conversion device which converts power from a power supply into power that is to be supplied to a motor with n-phase windings, where n is an integer of 3 or greater, the power conversion device comprising:
a first inverter connected to first ends of the n-phase windings, the first inverter including a first bridge circuit;
a second inverter connected to second ends of the n-phase windings, the second inverter including a second bridge circuit;
a first switching circuit including a first switch to switch between whether the first inverter and a ground are connected or disconnected; and
a second switching circuit including a second switch to switch between whether the second inverter and the power supply are connected or disconnected, or to switch between whether the second inverter and the ground are connected or disconnected; wherein the power conversion device has a first operation mode in which power conversion is performed using the second inverter and a first neutral point in the windings of each phase of the first inverter when the motor is driven in a low speed driving area, and a second operation mode in which power conversion is performed by n-phase energization control of the first and second inverters when the motor is driven in a high speed driving area;

the power conversion device further has a third operation mode in which, when the motor is driven in the low speed driving area, power conversion is performed using the first inverter and a second neutral point in the windings of each phase of the second inverter;

each of the first bridge circuit and the second bridge circuit includes n legs each including a low side switch and a high side switch;

in the first operation mode, the first switch is turned off, the second switch is turned on, and the high side switches are turned off and the low side switches are turned on in the first bridge circuit; and in the third operation mode, the first switch is turned on, the second switch is turned off, and the high side switches are turned off and the low side switches are turned on in the second bridge circuit.

* * * * *